July 4, 1950  R. D. MacDONALD  2,513,658
SIDE DUMP TRAILER STRUCTURE
Filed Aug. 27, 1947  4 Sheets-Sheet 1

INVENTOR.
Raymore D. MacDonald
BY Albert G. McCaleb
Atty

July 4, 1950  R. D. MacDONALD  2,513,658
SIDE DUMP TRAILER STRUCTURE
Filed Aug. 27, 1947  4 Sheets-Sheet 4

INVENTOR.
Raymore D. MacDonald
BY Albert G. McCaleb
atty.

Patented July 4, 1950

2,513,658

UNITED STATES PATENT OFFICE 2,513,658

SIDE DUMP TRAILER STRUCTURE

Raymore D. MacDonald, La Grange, Ill., assignor to Athey Products Corporation, Chicago, Ill., a corporation of Illinois Application August 27, 1947, Serial No. 770,832

16 Claims. (Cl. 298—13)

1

This invention relates to side dump trailer structures of the type adapted to have a swivel connection with, and to be drawn by a tractor, and particularly to a class of such trailers suited to hard use and to the carrying of heavy loads.

It is a general object of my invention to provide a stable, rugged and durable side dump trailer structure adapted to front support through a single swivel connection to a trailer or the like and suited to the carrying of heavy loads.

Another object of the invention is to provide a side dump trailer body incorporating reinforcing portions of tubular sectional structure.

My present invention also has within its purview the provision of a side dump trailer so constructed and arranged that the body normally rests directly upon the supporting underframe and may be selectively tipped to either side relative to the underframe for dumping.

As another object, the invention comprehends the provision of a side dump trailer wherein hinges carried by the trailer underframe are utilized for dumping the trailer body, and wherein the body is supported from the underframe, so that none of the load is normally supported through the hinges.

A further object of my invention is to provide a side dump trailer of the character described which is also constructed to have large load carrying capacity and a low center of gravity.

The present invention also provides a side dump trailer structure wherein both the body and underframe are constructed and reinforced to resist twisting stresses.

Other objects and advantages of the invention will be apparent from the following description and the accompanying drawings in which similar characters of reference indicate similar parts throughout the several views.

In the four sheets of drawings:

Fig. 4 is a fragmentary sectional view of a

2 portion of my side dump trailer structure, drawn to an enlarged scale and wherein the section is taken substantially on a line 4—4 of Fig. 1 and in the direction indicated by the arrows;

Figures 1, 2:
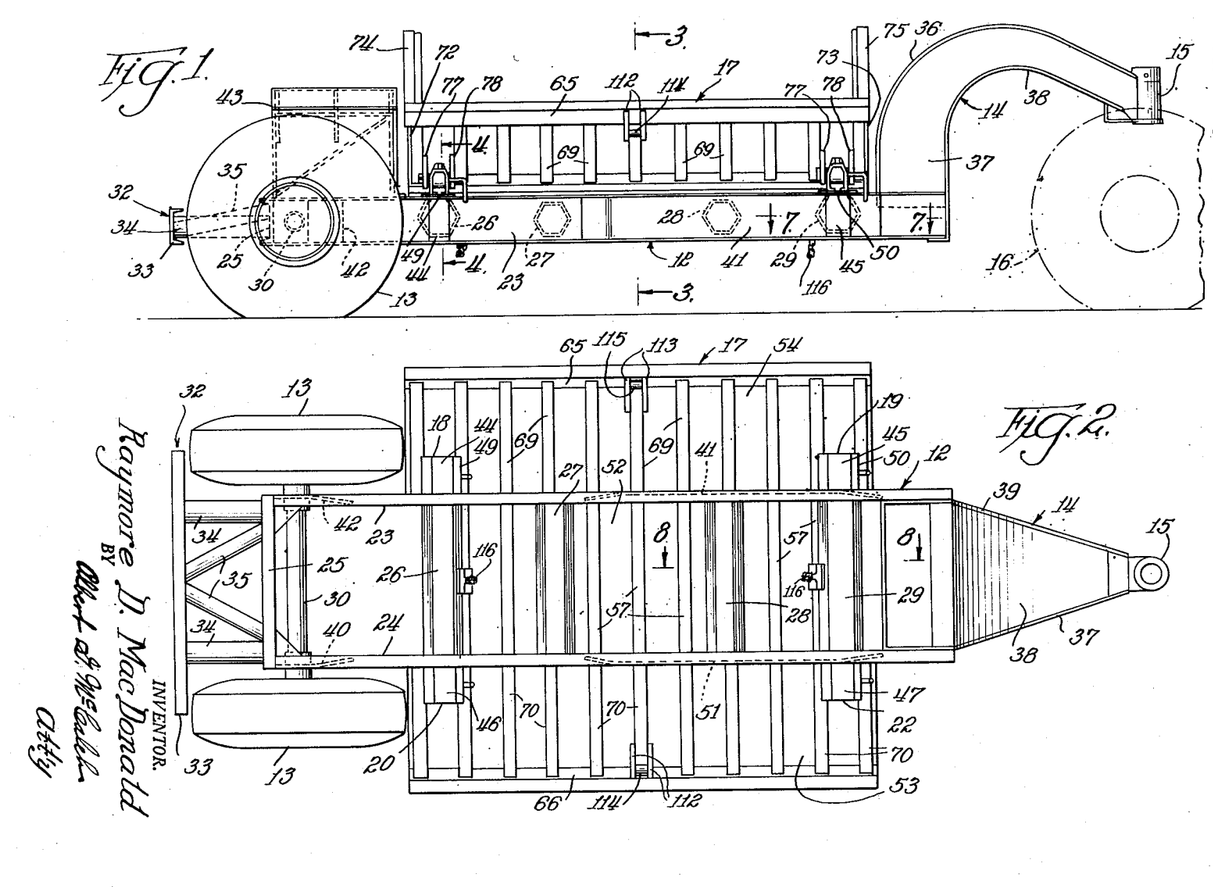
Fig. 1 is a side elevational view of a side dump trailer structure embodying a preferred form of my present invention.
Fig. 2 is a bottom view of the side dump trailer structure shown in Fig. 1.
Figure 3:
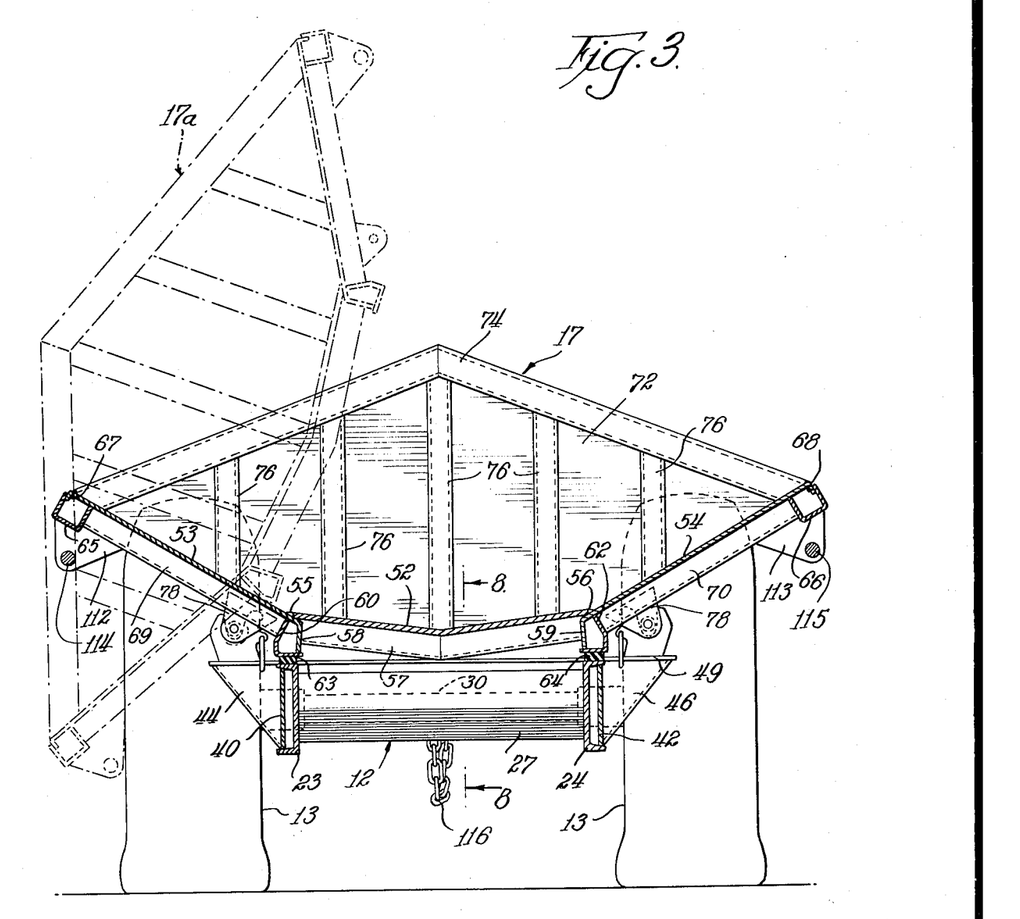
Fig. 3 is an end sectional view of the side dump trailer structure shown in Figs. 1 and 3, drawn to a somewhat larger scale than Figs. 1 and 2, wherein the section is taken substantially on a line 3—3 of Fig. 1, and viewed in the direction indicated by the arrows; different positions of the trailer body being depicted in solid and dot and dash lines.

Generally considering the exemplary embodiment of my side dump trailer structure which is shown for illustrative purposes in the accompanying drawings, it includes an underframe 12 supported near one end by a pair of wheels 13 and having at its other end a gooseneck connecting element 14 at the end of which, remote from the underframe, is a swivel connecting element 15 through which that end of the underframe is adapted to be carried and supported by a tractor or the like which is depicted fragmentarily at 16 in Fig. 1 by dot and dash lines. A side dump trailer body 17 is mounted on the underframe 12, as shown in Figs. 1, 2 and 3, between the wheels 13 and the gooseneck connecting element 14. By preference, the body is adapted, through the use of selectively operable hinges 18 and 19, in aligned relationship on one side of the body and underframe and by selectively operable hinges 20 and 22 in aligned relationship on the other side of the body and underframe, to be tilted for dumping purposes with reference to the underframe in the manner illustrated in dot and dash lines at 17a in Fig. 3.

Referring more in detail to the structure of the underframe 12, it comprises longitudinally extending and substantially parallel side beams 23 and 24 which are desirably of channel section and, for convenience, have their channel sides facing outwardly. At the rear end of the underframe, adjacent the wheels 13, the side beams 23 and 24 are connected and secured together by a cross beam 25. At their other ends, the side beams 23 and 24 are connected and secured together by the box-like lower end structure of the gooseneck connecting element 14. For further rigidifying the underframe structure, and particularly for increasing its resistance to tortional stresses, cross braces 26, 27, 28 and 29 of tubular section, and preferably of polygonal sectional form are disposed in longitudinally spaced relationship and extend between the inner surfaces of the side beams with their opposite ends secured to those side beams by welding or the like.

Figure 7:
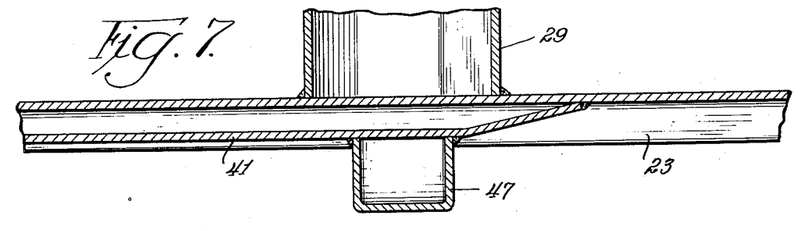
Fig. 7 is a fragmentary sectional view wherein the section is taken substantially as indicated by a line 7—7 in Fig. 1 and the accompanying arrows.

As one factor contributing to the maintenance of a low center of gravity of the trailer structure, an axle 30, upon the ends of which the wheels 13 are rotatably mounted, extends through the side beams near the rear end of the underframe, thus distinguishing from the usual structure which embodies a bolster or similar structure connecting the axle and underframe whereby the axle is beneath the underframe. In the disclosed structure, in which the axle extends through the side beams 23 and 24, it is preferable to provide gusset plates 40 and 42 fitted between the side flanges of the channel side beams and extending a substantial distance on each side of the axle. Additional strengthening of the side beam structure is also preferable near the front end thereof and is accomplished, as shown in Figs. 1, 2 and 7, by gusset plates 41 and 51 which extend along substantial portions of the front portion of the underframe between the side flanges of the side beam channel; said gusset plates being welded to the side beam channel along the edges of the gusset plates.

Although a rear bumper is a matter of choice, the disclosed embodiment includes such a bumper 32 in which a bumper bar 33 is secured to the cross beam 25 of the underframe by longitudinally extending trusses 34 near opposite sides of the underframe and diagonally disposed braces 35.

At the other end of the underframe, gooseneck connecting element 14 desirably comprises a structure of rectangular box-like section made of heavy formed metal plates, such as 36, 37, 38 and 39, welded together along their adjacent edges and tapering to a smaller section at the front end thereof. At the rear end, the dimensions of the connecting element are such that the lower end portion thereof fits between the ends of the side beams 23 and 24; the plates of the connecting element and the side beams being secured together by welding along their adjacent edges.

The gooseneck connecting element extends upwardly adjacent the underframe and then curves forwardly and downwardly toward the front end, to which the swivel connecting element 15 is secured by welding. The curvature is preferably such that when supported by and attached to a tractor, the tractor may be turned relative to the trailer without having the rear wheel of the tractor engage the gooseneck connecting element.

At the rear end of the underframe and as an additional portion of the structure which is a matter of choice, mud guards 43 are provided for each of the wheels, as depicted in Fig. 1.

Figures 6, 8, 9:
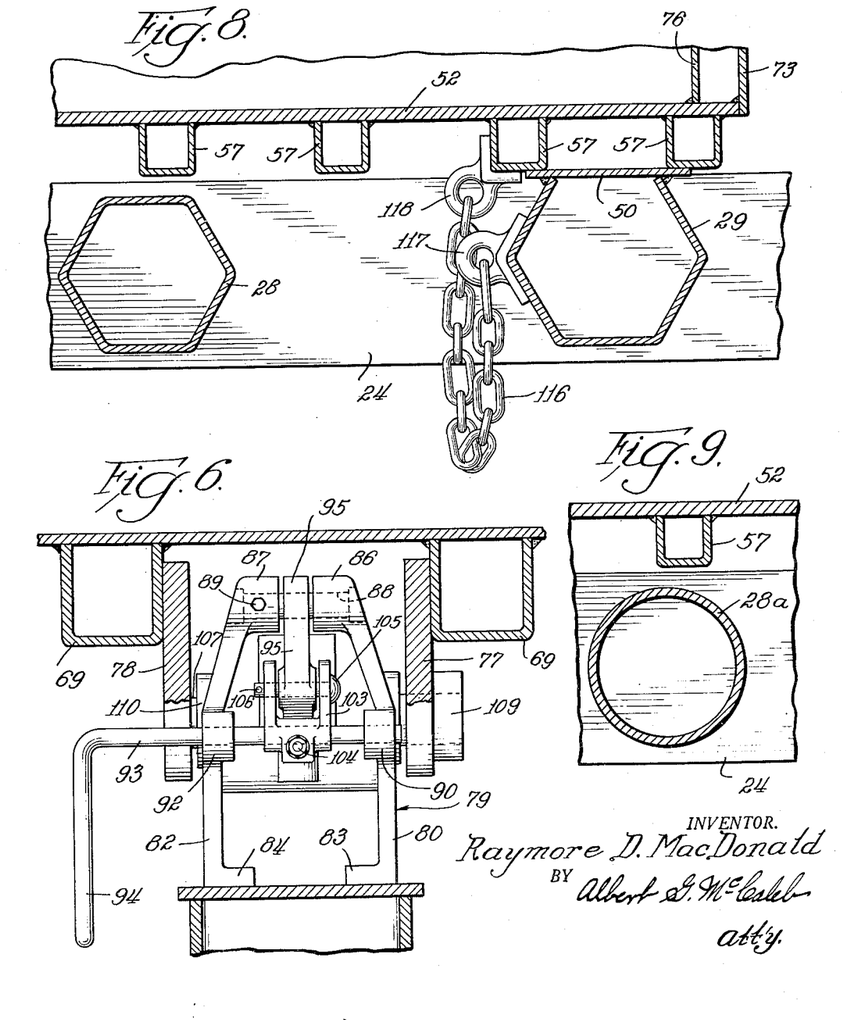
Fig. 6 is a fragmentary sectional view wherein the section is taken substantially on a line 6—6 of Fig. 4.
Fig. 8 is a fragmentary sectional view of a portion of the structure which is located by the section lines 8—8 in Figs. 2 and 3 and their accompanying arrows.
Fig. 9 is a fragmentary sectional view similar to a portion of Fig. 8 but depicting a modification of a part of the structure.

A modification of the underframe structure is shown in Fig. 9. In this modified construction, the cross braces 26, 27, 28 and 29 of the previously described structure and which are of hexagonal tubular section, are replaced by cross braces, such as 28a, of cylindrical section. In this, as in the previously described form, the ends of the cylindrical cross braces are welded to the substantially plane inner surfaces of the side beams 23 and 24.

As shown in Figs. 1 and 2, hinge brackets 44, 45, 46 and 47 are secured, preferably by welding, to the outer surfaces of the side beams 23 and 24 at longitudinally spaced positions; the hinge brackets 44 and 46 being on opposite sides of the underframe and the hinge brackets 45 and 47 being on opposite sides of the underframe in substantially aligned relationship laterally of the underframe. Preferably, and for promoting both strength and rigidity in the underframe structure, the hinge brackets 44 and 46 are substantially aligned with the cross brace 26 and the hinge brackets 45 and 47 are substantially aligned with the cross brace 29. Also, the cross braces 26 and 29 are desirably of somewhat larger sectional size than the cross braces 27 and 28.

Figure 4:
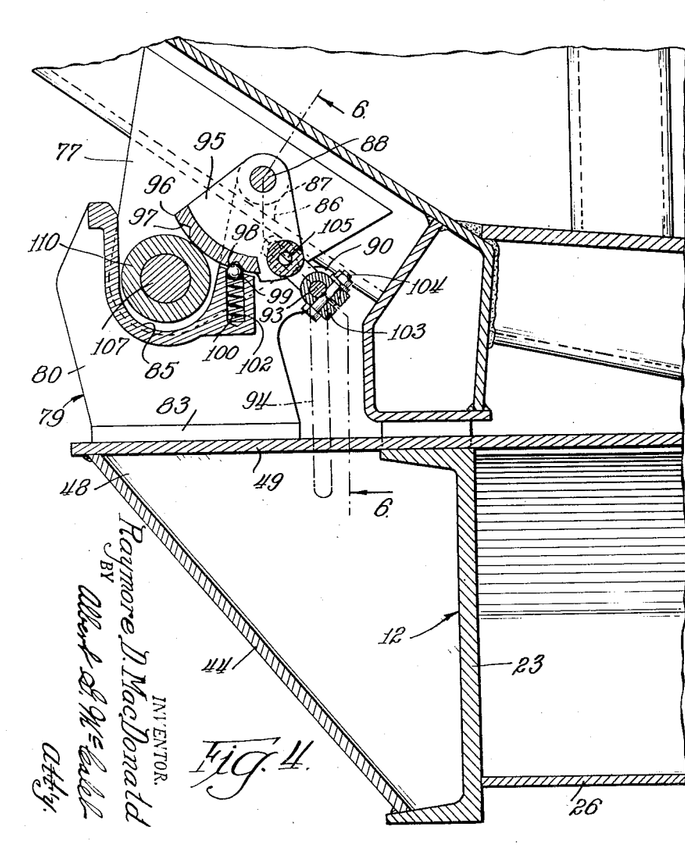
Figure 5:
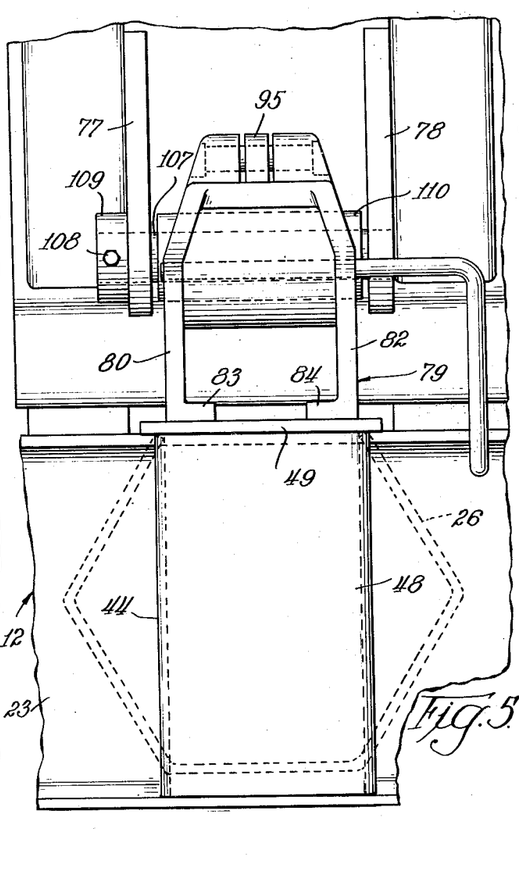
Fig. 5 is a fragmentary side elevational view of a portion of the structure shown in Fig. 1 drawn to an enlarged scale.

Each of the hinge brackets 44, 45, 46 and 47, as shown in detail in Figs. 4 and 5, includes a channel member 48 of substantially triangular shape and of practically the same height as the side beams secured to the outer surface of the side beam with the channel section thereof opening inwardly toward the side beam and the web of the channel resting on the lower side flange of the side beam. The web of each such channel member slopes upwardly and outwardly relative to the side beam and terminates at a position substantially flush with the upper surface of the side beam. Cross plates 49 and 50 extend across the underframe and overlie the laterally opposed channel members to provide upper hinge bracket surfaces which, by preference, extend somewhat beyond the edges of the channel members.

Although many features of the disclosed side dump trailer structure are not limited to such use, the disclosed embodiment of my invention is equipped with a body which is particularly well suited to heavy duty use in quarries and the like. This body 17, commensurate with other structural features of the trailer, is relatively low for maintaining the low center of gravity of the general trailer structure and is wide to provide a large load-carrying capacity. In addition, the bottom and side plates of the disclosed body are shaped and disposed to provide effectively for the desired side dumping action.

Upon reflection, it may be readily appreciated that in certain uses, such, for example, as in quarries, and particularly where loads are picked up at various places to be dumped at some fixed position or at places where there is room for side dumping operation, such side dumping has the advantage that the trailer may be quickly and easily moved into the dumping position without the necessity of maneuvering or backing into place, as is required by trailers or trucks which dump at the rear. When the dumping is done at a fixed position, as in the loading of railway cars or the like at a quarry, the power for tipping the body relative to the underframe may be supplied from an external source. On the other hand, it is sometimes desirable to utilize a hydraulic or other actuating mechanism for effecting the dumping operation by power obtained from the tractor to which the trailer is attached. The disclosed general structure is adapted to either type of actuation, although certain detailed parts which have been shown are suited to the application of power from an external source.

Referring to the structure of the trailer body, it includes a relatively heavy base plate 52 which is preferably bent to form a wide obtuse angle, the vertex of which is substantially aligned with the longitudinal center line of the underframe, as shown in Fig. 3. At each side of the base plate 52 oppositely disposed side plates 53 and 54 slope upwardly and outwardly from the edges of the base plate to form obtuse angles therewith. The side plates are practically coextensive with the base plate longitudinally of the structure and are secured thereto along the edges of the base plate by welded seams 55 and 56 (Fig. 3). On the lower surface of the base plate 52, and as shown in Figs. 2, 3 and 8, a series of laterally disposed cross ribs 57, which conform to the angularly disposed sides of the base plate, are secured thereto in spaced relationship longitudinally of the body. These cross ribs, as shown in Fig. 8, are desirably of channel section in themselves so that when secured to the base plate by welding, they form therewith braces of tubular box section.

Along the inner margins of the side plates 53 and 54, respectively, and adjacent the opposite side edges of the base plate 52, integral longitudinally extending flanges 58 and 59 are formed to extend downwardly below the base plate by bending the side plates. Channel members 60 and 62 of somewhat irregular sectional shape extend along the flanges 58 and 59 in spaced relationship thereto to form with the respective flanges and side plates longitudinally extending reinforcing ribs of tubular section. The channel members 60 and 62 are secured to the outer surfaces of the side plates 53 and 54 and to the edges of the flanges 58 and 59, respectively, by longitudinal welded seams. Also, the cross ribs 57 on the base plate abut and are welded to the flanges 58 and 59.

In my preferred construction, the longitudinally extending ribs of tubular section which are formed along the inner margins of the side plates and adjacent the outer edges of the base plate are spaced laterally of the body for alignment with the top surfaces of the side beams 23 and 24 of the underframe. Also, I provide resilient pads 63 and 64 of rubber or the like which are secured to the top surfaces of the side beams 23 and 24 to provide a seat upon which the body rests against the underframe to carry the load; the resilient pads being effective to distribute the body load over the full lengths of the side beams in spite of minor surface irregularities.

Reinforcing ribs of tubular or box-like section also extend longitudinally along the outer margins of the trailer body. These reinforcing ribs are provided by channel members 65 and 66 which abut the side plates 53 and 54, respectively, and lie along integral marginal flanges 67 and 68 on those side plates. In each instance, the channels 65 and 66 are secured to the side plates by longitudinal welded seams extending along the edges of the channels.

Intermediate the longitudinally extending reinforcing ribs and extending laterally of the side plates between those ribs are series of side plate reinforcing ribs 69 and 70. Each such reinforcing rib comprises a channel having its open side abutting the side plate and its ends abutting the longitudinally extending ribs. Also, each such side plate reinforcing rib is welded to its respective side plate and to the longitudinally extending reinforcing ribs. In my preferred structure, the side plate reinforcing ribs 69 and 70 are spaced longitudinally of the body and are substantially aligned laterally of the body with the cross ribs 57 on the base.

The ends of the body are closed by end plates 72 and 73. By preference, and to promote greater load-carrying capacity, the end plates are of greater height at the center than at their outer ends. Thus, as viewed from the end in Fig. 3, the top edges of the end plates slope downwardly and outwardly from the longitudinal center plane of the body to substantially flush relationship with the outer edges of the side plates 53 and 54.

Commensurate with the reinforcing structure of the other body surface parts, the end plates have channels 74 and 75 extending between the side plates along the upper marginal portions of the end plates 72 and 73, respectively, and welded thereto to form reinforcements of tubular box-like section. Furthermore, additional channels 76 are welded to the surfaces of the end plates in laterally spaced relationship to serve as vertically disposed reinforcing ribs for the end plates.

On the outer surfaces of the body side plates at positions near the inner longitudinally extending reinforcing ribs and aligned with the hinge brackets 44, 45, 46 and 47, hinge plates are secured to the body. That is, hinge plates 77 and 78 of substantially triangular shape are secured to opposed surfaces of adjacent side plate reinforcing ribs 69 in opposed and spaced relationship so that the space therebetween is aligned vertically with the hinge bracket 44 (Figs. 1, 4 and 6). In like manner, hinge plates 77 and 78 of similar construction are similarly secured to the side plate reinforcing ribs adjacent the hinge brackets 45, 46 and 47.

My preferred type of hinges for the disclosed side dump trailer construction is shown generally in Figs. 1 and 3, and in greater detail in the enlarged views of Figs. 4, 5 and 6. The construction of all of the hinges being alike, the description of one will suffice for all. Generally speaking, however, the axes of the hinges are aligned on each side of the underframe, so that whether the body is dumped to one side or the other of the underframe, it moves about the axes of the plurality of aligned hinges. Also, the hinges on each side of the body are manually controllable for selective operation. That is, when the body is to be dumped to one side, the hinges on the other side are opened or released, while the hinges on the said one side are closed for effective hinge operation, and vice versa.

Referring to the details of the hinge structure shown in Figs. 4, 5 and 6, each such hinge comprises a saddle 79 of cast structure and having similar and oppositely disposed side wall portions 80 and 82 in spaced and opposed relationship with integral feet 83 and 84 thereon, which feet seat against and are welded to the upper surface of the cross plate over one of the hinge brackets and closely adjacent a side beam of the underframe. As shown in Fig. 4, the side wall portions 80 and 82 of the saddle have substantially U-shaped top openings, such as 85, therein which are axially aligned to provide upwardly opening hinge seating surfaces.

Similar and oppositely disposed bracket arms 86 and 87 on and projecting upwardly from the side wall portions 80 and 82, respectively, are drilled to provide seating surfaces for a shaft 88, the axis of which is above and to one side of the axis of the seating surface of the U-shaped opening 85. As shown in Fig. 6, the shaft 88 is secured in position by fastening means, such as a set screw 89. Additional and oppositely disposed bracket arms 90 and 92 on the saddle side wall portions 80 and 82, respectively, are drilled to provide bearings which rotatably support a shaft 93, at one end of which is an angularly disposed handle portion 94. The axis of the shaft 93 is displaced to the same side of the seating surface of the U-shaped top opening of the saddle as the shaft 88, and is displaced below the axis of the shaft 88.

A cam 95 is rotatably supported on the shaft 88 and has an arcuate surface 96 which is concentric with respect to the axis of the shaft 88. Recesses 97 and 98 are provided in the arcuate surface 96 for coaction with a spring-urged detent comprising a ball 99 urged toward the arcuate surface by a compression spring 100, which spring is seated in an opening 102 in the saddle. The cam 95 is of a shape such that when the ball 99 is seated in the recess 98, as shown in Fig. 4, the outer portion of the arcuate surface of the cam overlies a substantial portion of the U-shaped opening 85 of the saddle. When, on the other hand, the cam is withdrawn to a position such that the ball 99 seats in the recess 97, the cam is withdrawn from the U-shaped opening of the saddle.

For effecting actuation of the cam 95 by manual movement of the handle 94, a substantially U-shaped link 103 is secured in non-rotatable relationship to the shaft 93 by a clamping bolt 104. Near the ends of the arms of the U-shaped link 103, a pin 105 extends through those arms and through an opening in the cam 95 which is displaced from the axis of the shaft 88, said pin being secured in position by fastening means such as a cotter key 106. Thus, by force applied to the handle 94, the shaft 93 is rotated to swing the arms of the U-shaped link 103 about the axis of the shaft 93, thereby to actuate the cam about the axis of the shaft 88.

A shaft 107 extends between and is carried by the hinge plates 77 and 78. At a position normally to extend across the saddle and with the axis of the shaft preferably displaced above the axis of the seating surface of the U-shaped top opening 85 in the saddle, the shaft 107 extends through aligned openings in the hinge plates 77 and 78 and is secured in position relative thereto by fastening means, such as a set screw 108, which extends through a collar 109 secured to the outer surface of the hinge plate 77. Rotatably carried by the shaft 107 between the hinge plates 77 and 78 is a hinge roller 110, which roller is rotatable upon the shaft.

Preferably, the roller 110 is of a size such that when the body is in its normal position resting upon the side beams 23 and 24 of the underframe, there is a substantial clearance between the roller and the seating surface of the U-shaped saddle opening. The roller is, however, disposed within the U-shaped saddle opening, but normally displaced therefrom by a clearance sufficient to relieve the hinges of load when the body is in the normal material-carrying position.

When the body is to be dumped to one side relative to the underframe, the cams of the hinges on the other side of the body are withdrawn from their respective saddle openings, while the cams on the said one side are actuated to a position in which they overlie their respective rollers. Thus, when the body is tilted toward the said one side, the rollers seat against the seating surfaces of the saddle openings to provide the desired hinge action.

It is to be particularly pointed out with respect to the disclosed design that the axes of the roller 110, cam 95, shaft 93 and pin 105 are so relatively disposed with respect to one another that the tendency of any force applied to the arcuate cam surface 96 by the roller 110 while the trailer body is being dumped with a heavy load therein, tends to move the cam toward, rather than away from, its position of engagement with the roller. In a similar respect, it is further to be noted that the axes of the shaft 88, pin 105 and shaft 93 are relatively disposed to resemble a toggle connection wherein the pin 105 crosses the center line between the shafts 88 and 93 during its movement between the two positions of the cam.

As previously mentioned, the force for tipping the body relative to the underframe in the disclosed embodiment of my invention is applied from an external source. For convenience, I have provided hook plates 112 and 113 in spaced relationship on opposite sides of the body; said hook plates being secured to the outer surfaces of the body side walls near the longitudinal center of the body and adjacent the outer margins thereof, as shown in Figs. 1 and 2. These hook plates carry therebetween hook bars 114 and 115, respectively, which are spaced outwardly of the side walls for convenient access for the attachment of a hook on a suitably driven lifting cable. By applying the lifting force to the hook bars on either side of the body, the body is tilted away from the hooked side and tipped to a position such as that indicated at 17a in Fig. 3.

In order to avoid excessive tilting movement of the body, it is by preference that I have provided a flexible link in the form of a chain 116 which interconnects the mid-portions of the bottom surface of the body to the mid-portion of the underframe. In the present instance, one end of the chain 116 is secured by a fastening element 117 to the outer surface of the cross brace 29 and the other end of the chain is connected by a fastening element 118 to the mid-portion of one of the cross ribs 57. The length of the chain is such that it limits the tilting movement of the body to the desired extent.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A side dump trailer adapted to be supported at one end and drawn by a tractor or the like and comprising, in combination, an underframe having longitudinally extending and substantially parallel side beams connected at one end by a laterally disposed end member, a gooseneck connecting member secured to the side beams at the other end of the underframe and having swivel connecting means at the forward end thereof, supporting wheels at the end of the underframe opposite the gooseneck connecting member and carried by an axle extending through said side beams, an open top body of a width greater than that of the underframe and of a length for mounting between the wheels and said gooseneck connecting member, said body having ribs of tubular section extending longitudinally along the bottom thereof and spaced for alignment with said side beams, resilient pads extending along and interposed between the side beams and said ribs through which the load of the body is normally carried on the side beams, and selectively operable hinges having portions secured to the underframe outside of the side beams and portions connected to the body so that the body may be dumped to either side relative to the underframe, said hinges having clearance between said portions thereof when the body is carried on the side beams.

2. A side dump trailer as defined in claim 1 wherein said underframe is braced intermediate its ends by tubular cross beams disposed in spaced relationship between the said end member and gooseneck connecting member and having their opposite ends secured to the side beams.

3. A side dump trailer adapted to be supported at one end and drawn by a tractor or the like and comprising, in combination, an underframe having longitudinally extending side beams and a laterally disposed end member connecting the side beams at one end, a connecting member connecting the side beams at the other ends of the underframe, and extending away from the underframe to a swivel connecting means at the forward end thereof, supporting wheels at said one end of the underframe and carried by an axle secured to said side beams, an open top body of a width greater than that of the underframe and of a length for mounting between the wheels and said connecting member, said body having ribs of tubular section extending longitudinally along the bottom thereof and spaced for alignment with said side beams, resilient pads extending along and interposed between the side beams and said ribs through which the load of the body is normally carried on the side beams, said body also having side walls sloping upwardly and outwardly from said ribs and terminating along their upper edges in additional tubular ribs extending longitudinally of the side walls in substantially parallel relationship to the first mentioned ribs, and selectively operable hinges having portions secured to the underframe outside of the side beams and portions connected to the body so that the body may be dumped to either side relative to the underframe, said hinges having clearance between said portions thereof when the body is carried on the side beams.

4. A side dump trailer adapted to be supported at one end and drawn by a tractor or the like and comprising, in combination, an underframe having longitudinally extending side beams and a laterally disposed end member connecting the side beams at one end, a connecting member connecting the side beams at the other ends of the underframe and extending away from the underframe to a swivel connecting means at the forward end thereof, supporting wheels at said one end of the underframe and carried by an axle secured to said side beams, an open top body of a width greater than that of the underframe and of a length for mounting between the wheels and said connecting member, said body having ribs of tubular section extending longitudinally along the bottom thereof and spaced for alignment with said side beams, resilient pads extending along and interposed between the side beams and said ribs through which the load of the body is normally carried on the side beams, said body also having side walls sloping upwardly and outwardly from said ribs and terminating along their upper edges in additional tubular ribs extending longitudinally of the side walls in substantially parallel relationship to the first mentioned ribs, and selectively operable hinges having portions secured to the underframe outside of the side beams and portions connected to the body so that the body may be dumped to either side relative to the underframe.

5. A side dump trailer adapted to be supported at one end and drawn by a tractor or the like and comprising, in combination, an underframe including longitudinally extending side beams and having secured to the front end thereof a gooseneck connecting member, said gooseneck connecting member having swivel connecting means at the forward end thereof, said underframe being braced intermediate its ends by a plurality of cross members of tubular section spaced apart longitudinally of the underframe and having their ends secured to the side beams, supporting wheels at the rear end of the underframe and carried by an axle secured to said side beams, an open top body of a width greater than that of the underframe and of a length for mounting between the wheels and said gooseneck connecting member, said body having ribs of tubular section extending longitudinally along the bottom thereof and spaced for alignment with said side beams, resilient pads extending along and interposed between the side beams and said ribs through which the load of the body is normally carried on the side beams, selectively operable hinges having portions secured to the underframe outside of the side beams and portions connected to the body so that the body may be dumped to either side relative to the underframe, two of said cross members being substantially aligned with the hinges laterally of the frame and being of larger cross-sectional size than the other of said cross members, and said hinges having clearance between said portions thereof when the body is carried on the side beams.

6. A side dump trailer adapted to be supported at one end and drawn by a tractor or the like and comprising, in combination, an underframe including longitudinally extending side beams and having secured to the front end thereof a gooseneck connecting member, said gooseneck connecting member having swivel connecting means at the forward end thereof, said underframe being braced intermediate its ends by a plurality of cross members of tubular section spaced apart longitudinally of the underframe and having their ends secured to the side beams, supporting wheels at the rear end of the underframe and carried by an axle secured to said side beams, an open top body of a width greater than that of the underframe and of a length for mounting between the wheels and said gooseneck connecting member, said body having ribs of tubular section extending longitudinally along the bottom thereof and spaced for alignment with said side beams, said ribs normally riding on the side beams to support the body relative to the underframe, hinges having portions secured to the underframe outside of the side beams and portions connected to the body so that the body may be dumped to either side relative to the underframe, and two of said cross members being substantially aligned with the hinges laterally of the frame and being of larger cross-sectional size than the other of said cross members.

7. A side dump trailer adapted to be supported at one end and drawn by a tractor or the like and comprising, in combination, an underframe including longitudinally extending side beams and having secured to the front end thereof a gooseneck connecting member, said gooseneck connecting member having swivel connecting means at the forward end thereof, said underframe being braced intermediate its ends by a plurality of cross members of tubular section spaced apart longitudinally of the underframe and having their ends secured to the side beams, supporting wheels at the rear end of the underframe and carried by an axle secured to said side beams, an open top body of a width greater than that of the underframe and of a length for mounting between the wheels and said gooseneck connecting member, said body having ribs of tubular section extending along the bottom thereof and spaced for alignment with said side beams, said ribs normally riding on the side beams to support the body relative to the underframe, said body also having side walls sloping upwardly and outwardly from said ribs and terminating along their upper edges in additional tubular ribs extending longitudinally of the side walls, and said ribs being connected by a plurality of lateral reinforcing braces of tubular section, hinges having portions secured to the underframe outside of the side beams and portions connected to the body so that the body may be dumped to either side relative to the underframe, and two of said cross members being substantially aligned with the hinges laterally of the frame and being of larger cross-sectional size than the other of said cross members.

8. In a side dump trailer, the combination comprising an underframe having longitudinally extending and substantially parallel side beams, said side beams being connected together at one end by a laterally disposed beam secured thereto, an axle extending through the side beams near the ends thereof which are connected by said laterally disposed beam and having wheels mounted thereon, a gooseneck connecting member providing a cross tie between the other ends of the side beams and rigidly secured thereto, said gooseneck connecting member being curved upwardly and outwardly and projecting away from said other ends of the side beams, swivel connecting means on the projecting end of the gooseneck connecting member, a plurality of cross braces of tubular section extending between the side beams, said cross braces being spaced apart longitudinally of the side beams and disposed between the said axle and gooseneck connecting member, and hinge brackets rigidly secured to each of the side beams in lateral alignment with one another and in alignment with certain of said cross braces.

9. In a side dump trailer, the combination comprising an underframe having hinge brackets secured to opposite sides thereof and hinge parts secured to the brackets, and a side dump body including a base plate, similarly constructed and oppositely disposed side plates coextensive longitudinally with the base plate and forming obtuse angles with opposite side edges of the base plates, said side plates forming parts of tubular reinforcing ribs extending longitudinally along the outer marginal surfaces of the side plates, channels secured to the outer surfaces of the side plates in spaced relationship longitudinally of the plates and providing tubular reinforcing ribs extending between the aforementioned ribs, hinge parts secured to the side plates adjacent said hinge parts on the underframe and providing hinges upon which the body may be dumped to either side relative to the underframe, end plates adjoining and secured to opposite ends of the base plate and side plates, said end plates having channels secured to the top margins thereof to provide reinforcements of tubular section, and said end plates also having additional channels secured thereto and disposed laterally of the channels at the top margins thereof.

10. In a side dump trailer as defined in claim 9, the tubular reinforcing ribs extending along opposite sides of the base plate normally riding on the underframe to support the load of the body.

11. In a side dump trailer as defined in claim 9, said body and underframe being connected by a flexible element for limiting the dumping movement of the body relative to the underframe, and said side plates having connecting parts secured to the outer surfaces thereof through which dumping force is applied to the body.

12. In a side dump trailer, the combination comprising an underframe, having longitudinally extending side beams, a body having longitudinally extending bottom reinforcing parts spaced to rest on the side beams, hinges having parts secured to the body and the underframe and about which said body is tiltable relative to the underframe, and means separate from the hinges and comprising said side beam and bottom reinforcing parts for normally supporting the load of the body relative to the underframe, said hinges each including a saddle secured to the underframe and having a substantially U-shaped top opening therein, and bracket means secured to the body and carrying a roller in a position for engagement in the U-shaped top opening in the saddle only upon and after the starting of tilting movement of the body.

13. In a side dump trailer as defined in claim 12 wherein said hinges are disposed in aligned relationship on opposite sides of the body and underframe for tilting movement of the body toward either of said sides, and selectively operable parts for retaining the rollers in the U-shaped top openings of the saddles.

14. In a side dump trailer as defined in claim 12 wherein said hinges are disposed in aligned relationship on opposite sides of the body and underframe for tilting movement of the body toward either of said sides, and selectively operable parts for retaining the rollers in the U-shaped top openings of the saddles, said selectively operable parts including a retaining element supported for swinging movement by and relative to said saddle between positions overlying and clear of said roller, and a manually operable mechanical linkage for actuating the retaining element between said positions.

15. In a side dump trailer as defined in claim 12 wherein said hinges are disposed in aligned relationship on opposite sides of the body and underframe for tilting movement of the body toward either of said sides, and selectively operable parts for retaining the rollers in the U-shaped top openings of the saddles, said selectively operable parts including a retaining element supported for swinging movement by and relative to said saddle between positions overlying and clear of said roller, a manually operable mechanical linkage for actuating the retaining element between said positions, and a spring urged detent for releasably holding the retaining element in either of said positions.

16. In a side dump trailer, the combination comprising a hinge having a saddle with a substantially U-shaped top opening therein, a bracket carrying a roller in a position disposed within the U-shaped top opening of the saddle, and a manually movable retaining element supported by the saddle for movement relative thereto between positions overlying and clear of the roller, whereby said hinge is rendered operable or separable, the direction of movement of the retaining element to the position overlying the roller being so related to one direction of movement of the hinge that such movement tends to urge the retaining element toward the position overlying the roller.

RAYMORE D. MacDONALD.

REFERENCES CITED

The following references are of record in the file of this patent:

UNITED STATES PATENTS

| Number | Name | Date |
|---|---|---|
| 1,182,643 | Clark | May 9, 1916 |
| 1,481,788 | Benbow | Jan. 29, 1924 |
| 1,611,012 | Flowers | Dec. 14, 1926 |
| 1,834,422 | Reeder | Dec. 1, 1931 |
| 1,909,969 | Kuchar | May 23, 1933 |
| 2,023,700 | Rodler | Dec. 10, 1935 |
| 2,155,594 | Hart | Apr. 25, 1939 |